(12) United States Patent
Jakobsson

(10) Patent No.: US 11,863,554 B2
(45) Date of Patent: Jan. 2, 2024

(54) SYSTEMS AND METHODS FOR AUTHENTICATING A USER BASED ON A BIOMETRIC MODEL ASSOCIATED WITH THE USER

(71) Applicant: PayPal, Inc., San Jose, CA (US)

(72) Inventor: Bjorn Markus Jakobsson, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/719,163

(22) Filed: Apr. 12, 2022

(65) Prior Publication Data
US 2022/0239644 A1 Jul. 28, 2022

Related U.S. Application Data

(63) Continuation of application No. 16/883,636, filed on May 26, 2020, now Pat. No. 11,349,835, which is a
(Continued)

(51) Int. Cl.
*H04L 9/40* (2022.01)
*H04L 9/32* (2006.01)
(Continued)

(52) U.S. Cl.
CPC .......... *H04L 63/0861* (2013.01); *G06F 21/32* (2013.01); *G06V 40/11* (2022.01);
(Continued)

(58) Field of Classification Search
CPC . H04L 63/0861; H04L 9/3231; H04L 63/102; G06F 21/32; G06F 2221/2103;
(Continued)

(56) References Cited

U.S. PATENT DOCUMENTS 5,483,601 A 1/1996 Faulkner
5,862,246 A 1/1999 Colbert
(Continued)

FOREIGN PATENT DOCUMENTS

CN 1211012 A 3/1999
CN 1211015 A 3/1999
(Continued)

OTHER PUBLICATIONS

Canadian Appl. No. 2898749, Examination Report dated Oct. 11, 2016, 5 pages.
(Continued)

*Primary Examiner* — Matthew Smithers
(74) *Attorney, Agent, or Firm* — Haynes and Boone, LLP

(57) ABSTRACT

Systems and methods as provided herein may create a biometric model associated with a user. The created biometric model may be used to generate challenges that are presented to the user for authentication purposes. A user response to the challenge may be compared to an expected response, and if the user response matches within a predetermined error of the expected response, the user may be authenticated. The systems and methods may further generate challenges that are adaptively designed to address weaknesses or errors in the created model such that the model is more closely associated with a user and the user is more likely to be the only person capable of successfully responding to the generated challenges.

20 Claims, 9 Drawing Sheets

Related U.S. Application Data continuation of application No. 16/196,884, filed on Nov. 20, 2018, now Pat. No. 10,666,648, which is a continuation of application No. 15/823,506, filed on Nov. 27, 2017, now Pat. No. 10,135,821, which is a continuation of application No. 14/929,647, filed on Nov. 2, 2015, now Pat. No. 9,832,191, which is a continuation of application No. 14/033,851, filed on Sep. 23, 2013, now Pat. No. 9,203,835.

(60) Provisional application No. 61/771,785, filed on Mar. 1, 2013.

(51) Int. Cl.
*G06F 21/32* (2013.01)
*H04W 12/06* (2021.01)
*H04W 12/069* (2021.01)
*G06V 40/10* (2022.01)
*G06V 40/60* (2022.01)
*H04W 12/68* (2021.01)

(52) U.S. Cl.
CPC ............ *G06V 40/67* (2022.01); *H04L 9/3231* (2013.01); *H04L 63/102* (2013.01); *H04W 12/068* (2021.01); *H04W 12/069* (2021.01); *G06F 2221/2103* (2013.01); *G06F 2221/2111* (2013.01); *H04W 12/68* (2021.01)

(58) Field of Classification Search
CPC . G06F 2221/2111; G06V 40/11; G06V 40/67; H04W 12/068; H04W 12/069; H04W 12/68
See application file for complete search history.

(56) References Cited

U.S. PATENT DOCUMENTS

| | | | |
|---|---|---|---|
| 6,185,316 B1 | 2/2001 | Buffam | |
| 6,317,834 B1 | 11/2001 | Gennaro et al. | |
| 6,341,170 B2 | 1/2002 | Ikebata et al. | |
| 6,678,733 B1* | 1/2004 | Brown | H04L 63/0209 713/172 |
| 6,851,051 B1 | 2/2005 | Bolle et al. | |
| 7,327,858 B2 | 2/2008 | Weiss | |
| 7,441,123 B2 | 10/2008 | Grant et al. | |
| 7,760,918 B2 | 7/2010 | Bezvershenko et al. | |
| 8,125,463 B2 | 2/2012 | Hotelling et al. | |
| 8,314,775 B2 | 11/2012 | Westerman et al. | |
| 8,380,995 B1 | 2/2013 | Paul | |
| 8,533,485 B1 | 9/2013 | Bansal et al. | |
| 8,856,541 B1 | 10/2014 | Chaudhury et al. | |
| 8,963,806 B1 | 2/2015 | Starner et al. | |
| 9,203,835 B2* | 12/2015 | Jakobsson | G06V 40/67 |
| 9,519,761 B2 | 12/2016 | Jakobsson | |
| 9,609,511 B2* | 3/2017 | Vural | H04W 8/18 |
| 9,799,338 B2* | 10/2017 | Grover | G10L 15/26 |
| 9,832,191 B2* | 11/2017 | Jakobsson | G06F 21/32 |
| 10,135,821 B2* | 11/2018 | Jakobsson | H04L 9/3231 |
| 10,666,648 B2* | 5/2020 | Jakobsson | G06F 21/32 |
| 11,349,835 B2* | 5/2022 | Jakobsson | H04W 12/069 |
| 2001/0048025 A1 | 12/2001 | Shinn | |
| 2002/0016405 A1 | 2/2002 | Friel et al. | |
| 2002/0164058 A1 | 11/2002 | Aggarwal et al. | |
| 2002/0174346 A1 | 11/2002 | Ting | |
| 2002/0174347 A1* | 11/2002 | Ting | G06F 21/57 713/186 |
| 2004/0017934 A1 | 1/2004 | Kocher | |
| 2004/0123106 A1 | 6/2004 | D'Angelo et al. | |
| 2004/0215615 A1 | 10/2004 | Larsson et al. | |
| 2005/0171851 A1* | 8/2005 | Applebaum | G07C 9/37 705/18 |
| 2005/0187883 A1 | 8/2005 | Bishop et al. | |
| 2006/0277043 A1* | 12/2006 | Tomes | G10L 17/24 704/E17.016 |
| 2006/0294390 A1* | 12/2006 | Navratil | G06F 21/31 713/182 |
| 2007/0061590 A1* | 3/2007 | Boye | G06F 21/305 713/186 |
| 2007/0063816 A1 | 3/2007 | Murakami et al. | |
| 2007/0079136 A1 | 4/2007 | Vishik et al. | |
| 2007/0143825 A1* | 6/2007 | Goffin | H04L 63/08 726/2 |
| 2007/0211921 A1 | 9/2007 | Popp et al. | |
| 2008/0166028 A1 | 7/2008 | Turek et al. | |
| 2008/0250477 A1 | 10/2008 | Samuelsson et al. | |
| 2008/0263652 A1 | 10/2008 | McMurtry et al. | |
| 2009/0319270 A1 | 12/2009 | Gross | |
| 2010/0115607 A1 | 5/2010 | Pratt et al. | |
| 2011/0072488 A1 | 3/2011 | Bi et al. | |
| 2011/0078773 A1 | 3/2011 | Bhasin et al. | |
| 2011/0082791 A1 | 4/2011 | Baghdasaryan et al. | |
| 2011/0205016 A1 | 8/2011 | Al-Azem et al. | |
| 2011/0314539 A1 | 12/2011 | Horton | |
| 2012/0054057 A1 | 3/2012 | O'Connell et al. | |
| 2012/0084078 A1 | 4/2012 | Moganti et al. | |
| 2013/0108145 A1 | 5/2013 | Cobb et al. | |
| 2013/0132091 A1* | 5/2013 | Skerpac | G06F 21/32 704/273 |
| 2013/0138964 A1 | 5/2013 | Joyce, III | |
| 2013/0182902 A1 | 7/2013 | Holz | |
| 2013/0198832 A1 | 8/2013 | Draluk et al. | |
| 2013/0200996 A1 | 8/2013 | Gray et al. | |
| 2013/0224128 A1 | 8/2013 | Chung et al. | |
| 2013/0239191 A1 | 9/2013 | Bostick | |
| 2013/0262873 A1 | 10/2013 | Read et al. | |
| 2013/0265218 A1 | 10/2013 | Moscarillo | |
| 2014/0007185 A1 | 1/2014 | Han et al. | |
| 2014/0068726 A1 | 3/2014 | Jakobsson | |
| 2014/0090039 A1 | 3/2014 | Bhow | |
| 2014/0250515 A1 | 9/2014 | Jakobsson | |
| 2015/0073800 A1* | 3/2015 | Bansal | G10L 17/24 704/246 |
| 2015/0347734 A1* | 12/2015 | Beigi | H04L 9/3268 726/28 |
| 2015/0379250 A1* | 12/2015 | Saito | G07C 9/257 726/7 |
| 2016/0087957 A1 | 3/2016 | Shah et al. | |
| 2018/0181208 A1 | 6/2018 | Moscarillo | |

FOREIGN PATENT DOCUMENTS

| | | |
|---|---|---|
| CN | 102609129 A | 7/2012 |
| JP | H1153540 A | 2/1999 |
| JP | 2003067750 A | 3/2003 |
| JP | 2004276298 A | 10/2004 |
| JP | 2007045142 A | 2/2007 |
| JP | 2007328590 A | 12/2007 |
| JP | 2009140390 A | 6/2009 |
| JP | 2009152043 A | 7/2009 |
| JP | 2010287734 A | 12/2010 |
| JP | 2011059749 A | 3/2011 |
| JP | 2011164634 A | 8/2011 |
| JP | 2012117770 A | 6/2012 |
| JP | 2014159197 A | 9/2014 |
| WO | 2010085335 A1 | 7/2010 |
| WO | 2013020577 A2 | 2/2013 |

OTHER PUBLICATIONS

Chinese Appl. No. 201480004021.9, Chinese Office Action for dated Jun. 2, 2017, 29 pages.

Chinese Appl. No. 201480004021.9, Search Report dated May 24, 2017, 2 pages.

Chinese Appl. No. 201480004021.9, Second Chinese Office Action for dated Mar. 8, 2018, 15 pages.

European Appl. No. 14756444.7, European Extended Search Report dated Sep. 30, 2016, 6 pages.

International Appl. No. PCT/US2014/018310, International Search Report and Written Opinion dated Jul. 14, 2014, 9 pages.

(56) References Cited

OTHER PUBLICATIONS

International Preliminary Report on Patentability for Application No. PCT/US2014/018310 dated Sep. 11, 2015, 8 pages.
Japanese Appl. No. 2015-559265, Office Action dated Sep. 13, 2016, 1 pages.
Sae-Bae N., et al., "Biometric-Rich Gestures: A Novel Approach to Authentication on Multi-Touch Devices, Session: I Am How I Touch: Authenticating Users", CHI 2012, May 5-10, 2012, Austin, Texas, 10 pages.

* cited by examiner

SYSTEMS AND METHODS FOR AUTHENTICATING A USER BASED ON A BIOMETRIC MODEL ASSOCIATED WITH THE USER

CROSS REFERENCE TO RELATED APPLICATIONS

This application is a continuation of U.S. application Ser. No. 16/883,636, filed May 26, 2020, which is a continuation of U.S. application Ser. No. 16/196,884, filed Nov. 20, 2018, issued as U.S. Pat. No. 10,666,648 on May 26, 2020, which is a continuation of U.S. application Ser. No. 15/823,506, filed Nov. 27, 2017, and issued as U.S. Pat. No. 10,135,821 on Nov. 20, 2018, which is a continuation of U.S. application Ser. No. 14/929,647, filed Nov. 2, 2015, and issued as U.S. Pat. No. 9,832,191 on Nov. 28, 2017, which is a continuation of U.S. application Ser. No. 14/033,851, filed Sep. 23, 2013, and issued as U.S. Pat. No. 9,203,835 on Dec. 1, 2015, and which claims priority to U.S. Provisional Application Serial No. 61/771,785, filed Mar. 1, 2013, all of which applications are incorporated in their entirety herein by reference.

BACKGROUND

Technical Field

Embodiments disclosed herein are related to systems and methods for authenticating a user based on a biometric model associated with the user. In particular, systems and methods disclosed herein may create a biometric model associated with a user, and use the created model to authenticate a user.

Related Art

Known biometric authentication techniques include fingerprint sensors and hand signature sensors. Fingerprint sensors are included with some personal computing devices and require a user to place or swipe a finger on the sensor. The data obtained by the sensor is compared to a stored or external template or model to determine user identity based on a probability that certain indicia within the template are met. Hand signature authentication techniques require a user to sign on an electronic pad. Indicia about the received signature, including a speed, pressure, and the actual pattern represented by the signature are analyzed to determine a probability of the indicia matching. Iris and other optical authentication is similar, where an optical scan is taken, and certain indicia are matched to a template. These techniques are all risk-based authentication techniques where a determination is made as to whether certain features are met based on a predetermined threshold.

Biometric authentication methods based on indicia of a user's hand have been recently discloses. The disclosed methods require the user to perform an action with the hand many times that is recorded by a biometric sensor. Then, to authenticate, the user is again asked to perform the action. The performed action is compared to the recorded actions to determine how closely the performed action matches the recorded actions, wherein enough similarity results in a successful authentication. The idea is that due to the differences between individual user's hands, there is enough entropy that even if an attacker sees a user performing the action, it is unlikely that the attacker has the same hand and, thus, the action will be performed differently. However, this authentication method does not understand what a hand looks like, but only asks that the user memorize the action so that they can perform it when asked.

Figure 1:
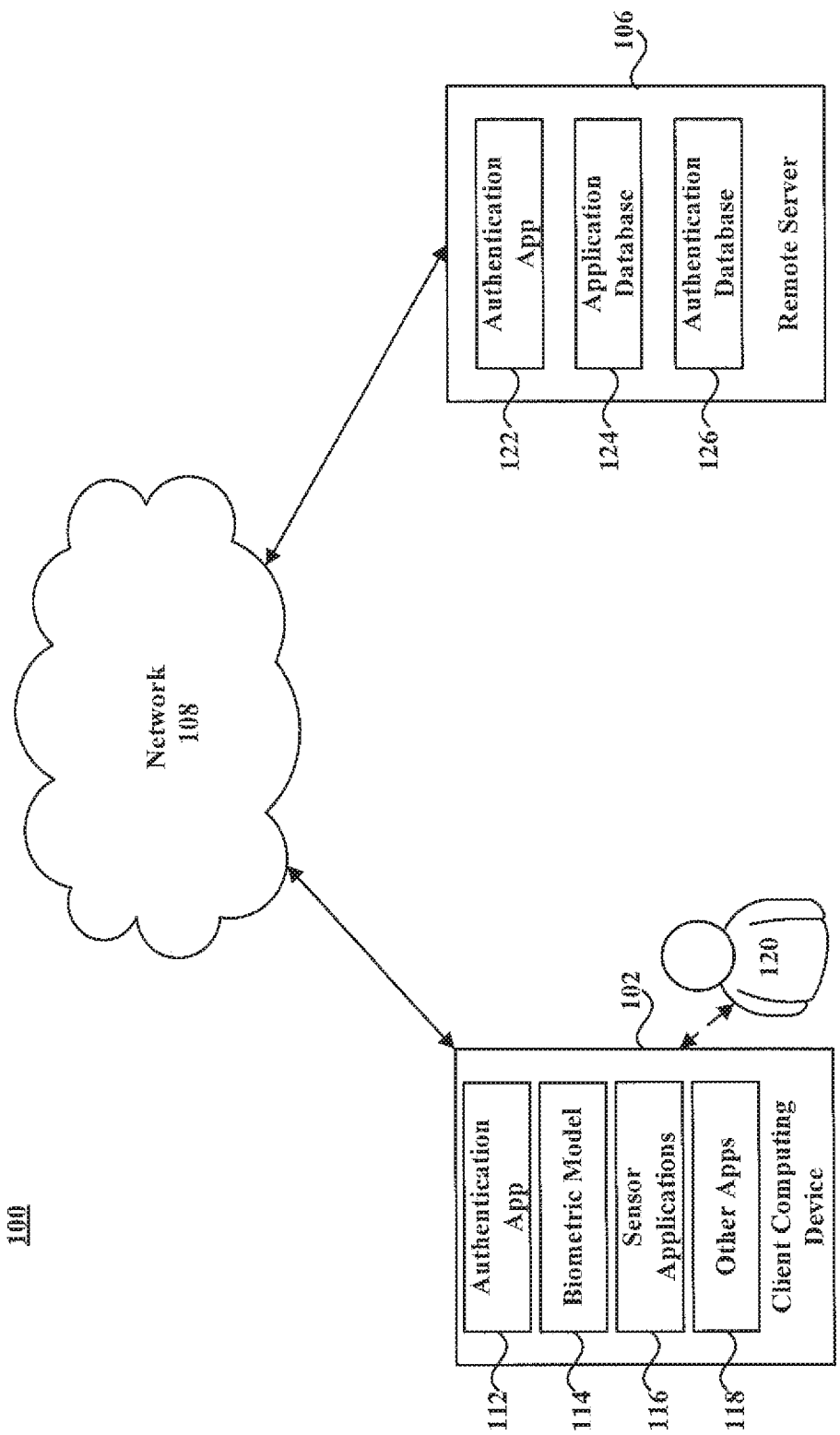
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need for a more secure biometric authentication system that constructs a biometric model associated with the user that is more unique to the user than current templates or models.

Consistent with some embodiments, there is provided a system for authenticating a user. The system includes one or more processors configured to determine a biometric model of the user, generate at least one challenge, determine an expected response based on the determined biometric model and the generated challenge, and determine if a received response matches the expected response within a predetermined degree of accuracy. The system also includes a biometric sensor configured to receive the response and a memory storing the determined biometric model. The system further includes a network interface component coupled to a network, the network interface component configured to transmit a successful authentication when the received response matches the expected response within a predetermined degree of accuracy.

Consistent with some embodiments, there is further provided a method for authenticating a user. The method includes steps of determining a biometric model of the user, storing the determined biometric model, generating at least one challenge in response to a request for authentication, determining an expected response based on the stored model and the generated at least one challenge, and transmitting a successful authentication when a received response matches the expected response within a predetermined degree of accuracy. The method may be embodied in non-transient computer-readable media.

These and other embodiments will be described in further detail below with respect to the following figures.

FIG. 1 is a block diagram of a networked system 100, consistent with some embodiments. System 100 includes a client computing device 102 and a remote server 106 in communication over a network 108. Remote server 106 may be a payment service provider server that may be maintained by a payment provider, such as PayPal, Inc. of San Jose, CA Server 106 may be maintained by other service providers in different embodiments. Remote server 106 may also be maintained by an entity with which sensitive credentials and information may be exchanged with client computing device 102. Remote server 106 may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 108. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, and/or various other generally known types of computing devices. Consistent with some embodiments, client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. For example, such instructions may include authentication app 112 for authenticating client computing device 102 to remote server 106. Consistent with some embodiments, authentication app 112 may be a mobile authentication app, which may be used to authenticate user 120 to remote server 106 over network 108. Authentication app 112 may include a software program, such as a graphical user interface (GUI), executable by one or more processors that is configured to interface and communicate with the remote server 106 or other servers managed by content providers or merchants via network 108.

Client computing device 102 may also include biometric model application 114 for creating a biometric model and issuing biometric challenges based on the created model for authenticating a user of computing device 102 to remote server 106. Client computing device 102 may also include sensor applications 116. Consistent with some embodiments, sensor applications 116 include applications which utilize sensor capabilities within client computing device 102 to monitor characteristics of device 102, user 120, and/or the environment surrounding client computing device 102. Such characteristics include obtaining images (video or still) of user 120 using camera functionalities of client computing device 102, obtaining accelerometer readings using an accelerometer in client computing device 102, using a geographical location of user 120 and/or client mobile device using global positioning system (GPS) functionality of client computing device 102 and/or obtaining a relative location using an internet protocol (IP) address of client computing device 102. Consistent with some embodiments, characteristics of client computing device 102, user 120, and/or the environment around client computing device 102 may be captured using sensor applications 116 and used by authentication app 112 for authentication purposes. Further, sensor applications 116 may work with biometric model application 114 and authentication application 112 for capturing and creating a biometric model of user 120 for use in authentication with remote server 106.

Client computing device 102 may also include other applications 118 as may be desired in one or more embodiments to provide additional features available to user 120, including accessing a user account with remote server 106. For example, applications 118 may include interfaces and communication protocols that allow the user to receive and transmit information through network 108 and to remote server 106 and other online sites. Applications 118 may also include security applications for implementing client-side security features, programmatic client applications for interfacing with appropriate application programming interfaces (APIs) over network 108 or various other types of generally known programs and/or applications. Applications 118 may include mobile apps downloaded and resident on client computing device 102 that enables user 120 to access content through the apps.

Remote server 106 according to some embodiments, may be maintained by an online payment provider, which may provide processing for online financial and information transactions on behalf of user 120. Remote server 106 may include at least authentication application 122, which may be adapted to interact with authentication app 112 of client computing device 102 over network 108 to authenticate client computing device 102 to remote server 106. Remote server 106 may also include an application database 124 for storing various applications for interacting with client computing device 102 over network 108 for purposes other than authentication. Such applications may include applications for authentication, conducting financial transactions and shopping and purchasing items.

Figure 2:
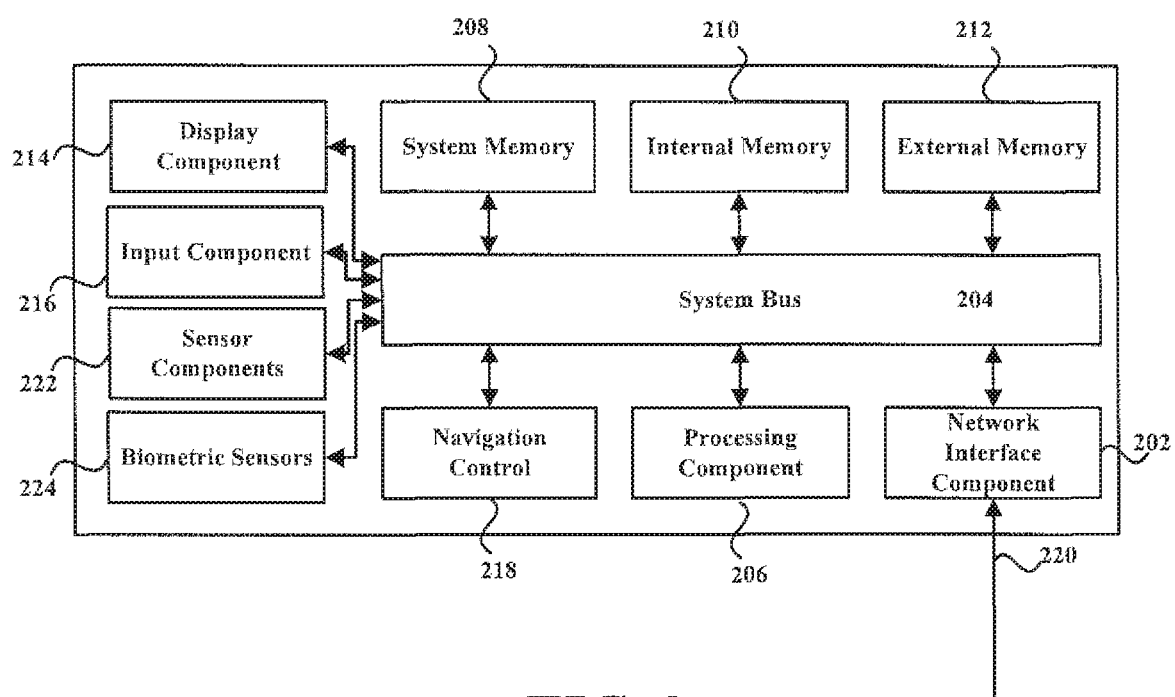
FIG. 2 is a diagram illustrating computing system, consistent with some embodiments.

FIG. 2 is a diagram illustrating computing system 200, which may correspond to any of client computing device 102 or remote server 106, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), or graphics processing units (GPUs), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user 120 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 120 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media or volatile media. The medium may correspond to any of system memory 208, internal memory 210 and/or external or static memory 212. Consistent with some embodiments, the computer readable medium is tangible and non-transitory. In various implementations, non-volatile media include optical or magnetic disks, and volatile media includes dynamic memory. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 220 and network interface component 202. Communication link 220 may be wireless through a wireless data protocol such as Wi-Fi™, 3G, 4G, HSDPA, LTE, RF, NFC, or through a wired connection. Network interface component 202 may include an antenna, either separate or integrated, to enable transmission and reception via communication link 220. Received program code may be executed by processing component 206 as received and/or stored in memory 208, 210, or 212.

Computing system 200 may also include sensor components 222 and biometric sensors 224. Sensor components 222 and biometric sensors 224 may provide sensor functionality for sensor apps 116 and biometric model app 114, and may correspond to sensors built into client computing device 102 or sensor peripherals coupled to client computing device 102. Sensor components 222 may include any sensory device that captures information related to the surroundings of client computing device 102. Sensor components 222 may include camera and imaging components, accelerometers, GPS devices, motion capture devices, and other devices that are capable of providing information about client computing device 102, user 120, or their surroundings. Biometric sensors 224 may include biometric readers, optical sensors such as camera devices, capacitive sensors such as may be found in a capacitive touch screen, pressure sensors, fingerprint readers, hand scanners, iris scanners, electromagnetic sensors that detect the EM field produced by a hand, and the like. Consistent with some embodiments, sensor components 222 and biometric sensors 224 may be configured to work with sensor applications 116 and biometric model application 114 to collect biometric information from user 120 that may be used to create a biometric model associated with user 120 that may be used for authenticating to remote server 106.

Figure 3:
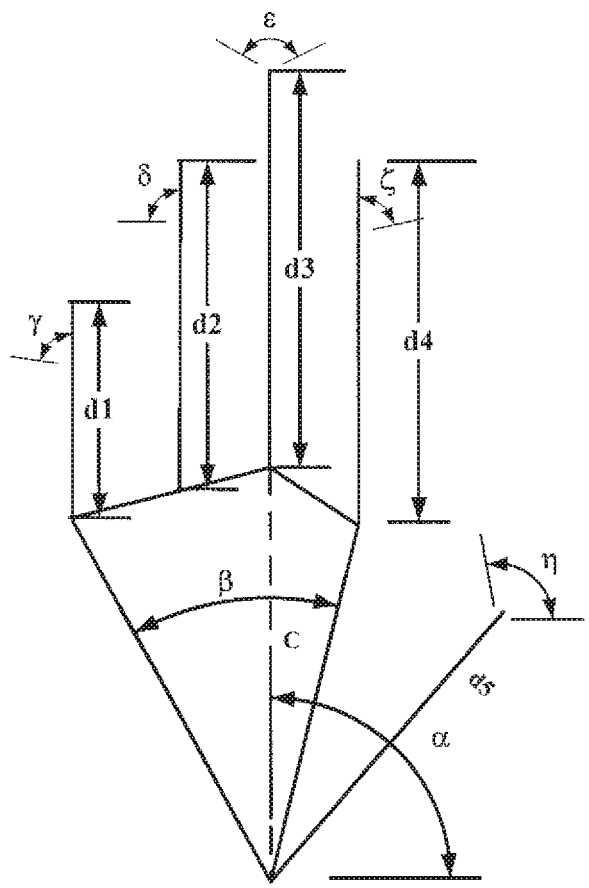
FIG. 3 is a diagram illustrating a biometric model of a user's hand, consistent with some embodiments.

FIG. 3 is a diagram illustrating a biometric model of a user's hand, consistent with some embodiments. As shown in FIG. 3, model 300 includes unknowns that may be determined by requiring user 120 to perform challenges that are designed to determine the value of the unknowns and complete the model. Some of the values may be related by equations and, thus, some unknown values may be determined through the determination of other values. Model 300 may include such values as a distance from the finger joints on the hand to the finger tips, angles of the fingers on the hand, the maximum lengths of the fingers, the length of the thumb, and a basis line from which a thumb can move, some of which are shown in FIG. 3. For example, the little finger has a length of d1 and can move radially over an angle γ. The ring finger has a length of d2, and can move radially over an angle δ. The middle finger has a length of d3 and can move radially over an angle ε. The index finger has a length of d4 and can move radially over an angle ζ. The thumb has a length of d5 and can move radially over an angle η. Moreover, there is an angle β between one side of the palm and the other side. Further, the thumb can move radially outward from the palm to create an angle α0 with a centerline C of the palm. These distances and angles, once determined, may be used to define a model of the hand that may uniquely identify user 120. Consequently, once the model has sufficient data to ensure a reasonably probability that user 120 is who they are claiming to be, authentication app 112 may use the biometric model for authentication to remote server 106 based on the probability. The model shown in FIG. 3 is just one biometric model that may be used for authentication purposes. Different biometric models with different unknowns and degrees of security may be constructed and used for authentication, and such models are within the spirit and scope of this disclosure.

Figure 4:
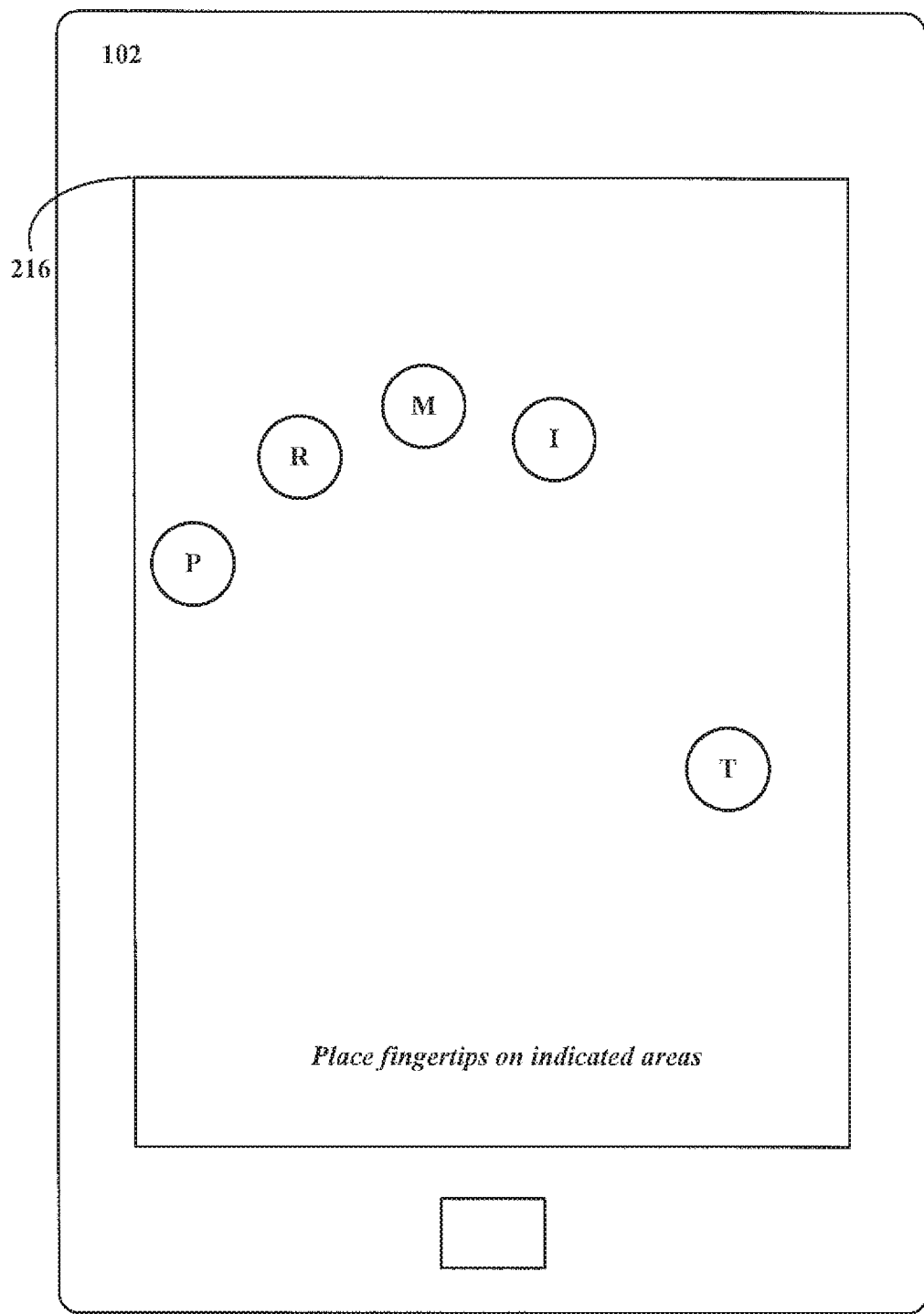
FIG. 4 is a diagram illustrating an example of a challenge that may be used to create a biometric model, consistent with some embodiments.

FIG. 4 is a diagram illustrating an example of a challenge that may be used to create a biometric model, consistent with some embodiments. As shown in FIG. 4, a challenge may be displayed by a display component 214 of client computing device 102 that asks user 120 to align a biometric identifier with respect to biometric sensors 224. As particularly shown in FIG. 4, the challenge requires user 120 to align their fingertips with the indicated areas displayed on display component 214 by placing their fingers on the indicated areas of display component 214. The challenge may include labeled circles indicating which finger to place in which circle, as shown in FIG. 4. The challenge may also include displayed instructions, such as shown in FIG. 4. According to some embodiments, other instructions may be displayed in order to provide user 120 with enough information to perform the displayed challenge. Information concerning the challenge may also be displayed to user. This information may include an indication when biometric sensor 224 has detected that user 120 has aligned a biometric identifier as required by the challenge. This information may also be provided by a displayed alert or an audible alert providing information to user 120, or a displayed timer informing user 120 of how much time user has to complete the alignment. The displayed challenge may be generated by processing component 206 executing instructions associated with biometric model application 114. The generated challenge may be adaptive to attempt to obtain information that is not known about user 120. In particular, the generated challenge may be a challenge designed to reduce an error with which biometric application 114 is able to identify user 120 within a predetermined probability. The challenge may be part of a training session designed to capture sufficient information to create a model, such as model 300, or as part of a game that is designed to capture the same information. Consistent with some embodiments, the challenges are constrained challenges, meaning that there is a predetermined constraints associated with a response. Moreover, the challenges may be designed to model a three dimensional object, such as a hand, in two dimensions.

Figure 5:
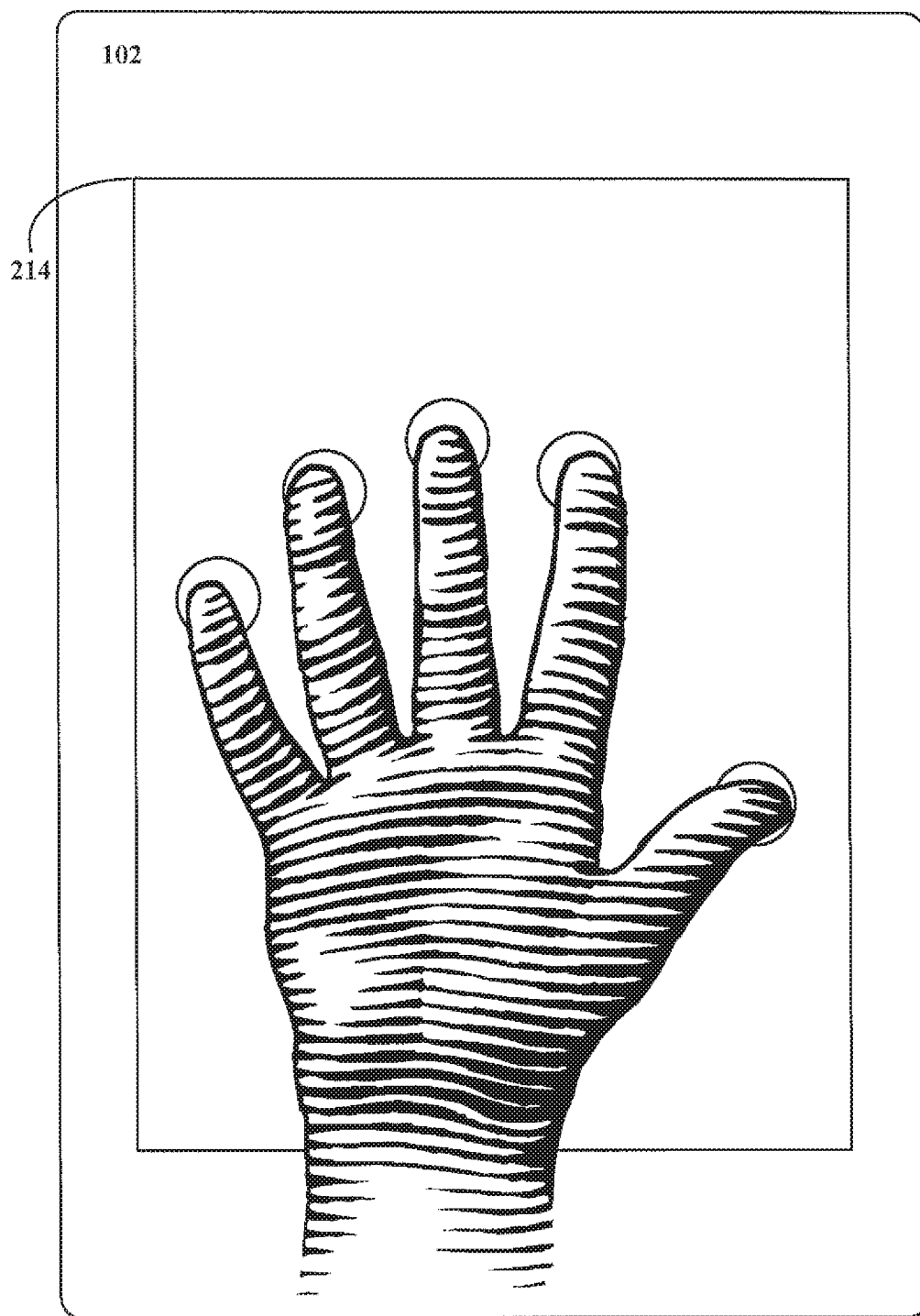
FIG. 5 is a diagram illustrating user performing the challenge shown in FIG. 4, consistent with some embodiments.

FIG. 5 is a diagram illustrating user performing the challenge shown in FIG. 4, consistent with some embodiments. As shown in FIG. 5, user 120 has placed their fingertips in the areas indicated by the challenge shown in FIG. 4. Consistent with some embodiments, display component 214 is a touch screen device having sensors for detecting a touch of user and, thus, biometric sensors 224 and/or other sensors 222 are integrated into display component 214 and may be part of or a particular function associated with display component 214 and may be configured to detect a touch of user's 120 hand. Based on the detected locations, some of the unknowns shown in FIG. 3 may be determined to create the biometric model of user's 120 hand. Performing the challenge, such as shown in FIG. 5, may produce a response that has some truth and error associated therewith. Processing component 206 may use normal statistical methods for fitting the response to the model such as model 300 to provide a model that has a maximum probability of corresponding to user 120, with a minimum associated error.

Figure 6:
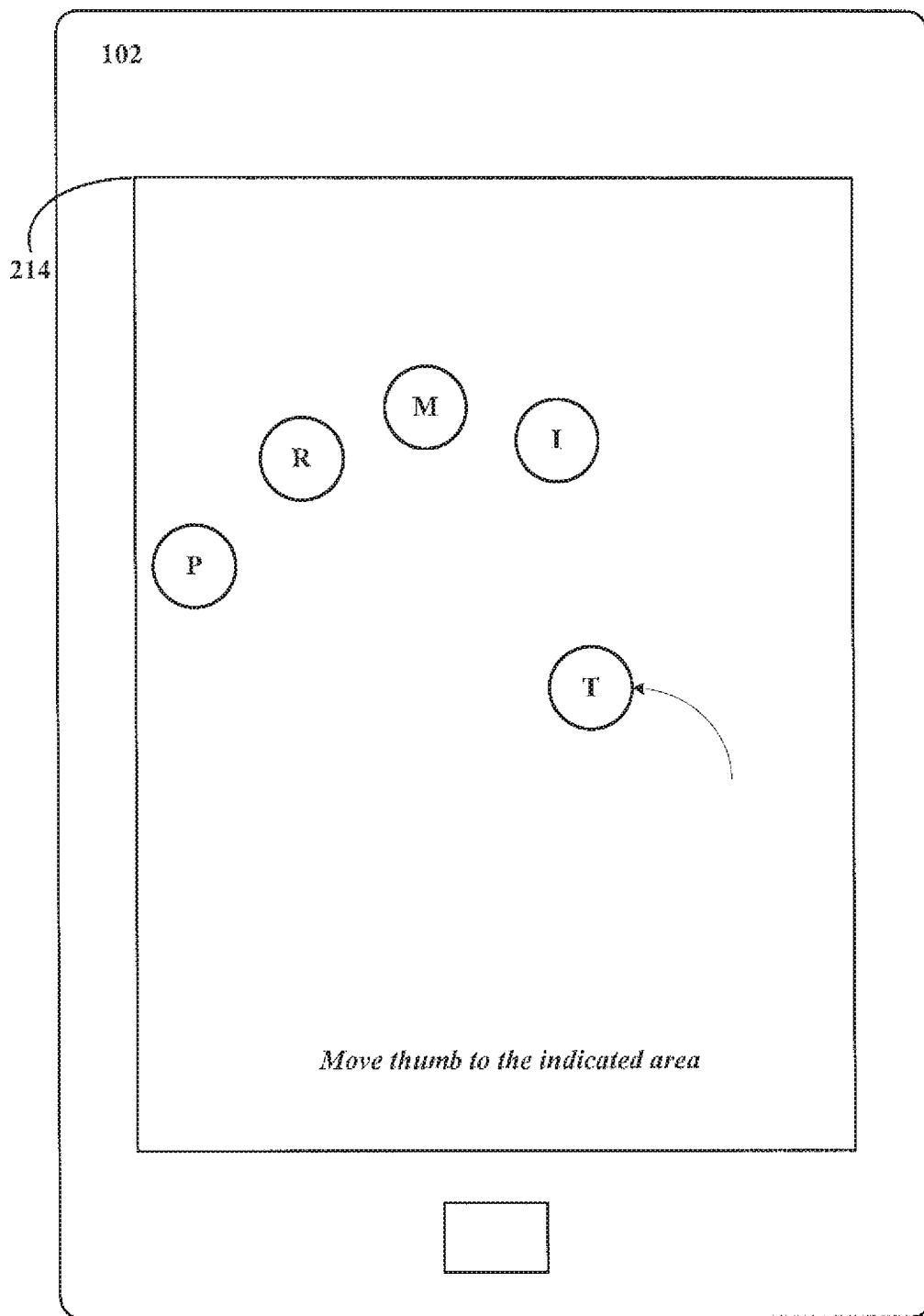
FIG. 6 is a diagram illustrating another challenge that may be used to create a biometric model, consistent with some embodiments.

FIG. 6 is a diagram illustrating another challenge that may be used to create a biometric model, consistent with some embodiments. As shown in FIG. 6, the challenge requests that user 120 place their fingertips in similar locations to those shown in FIG. 4. The challenge also requests that user 120 move radially towards their palm. This movement may be detected by biometric sensors 224 and/or other sensors 222 and used to determine additional information about model 300 such as the unknowns of α and η. Consistent with some embodiments, display component 214 is a touch screen device having sensors for detecting a touch of user and, thus, biometric sensors 224 and/or other sensors 222 are integrated into display component 214 and may be part of or a particular function associated with display component 214.

The generated challenge may also be used to authenticate user 120. Once computing device 102 has sufficient information to reasonably identify user 120 beyond a predetermined probability, computing device 102 may generate challenges that fit the created model and should be uniquely identified with user 120. Consequently, performing the challenge shown in FIG. 6 may authenticate user 120 to remote server 106.

Figure 7:
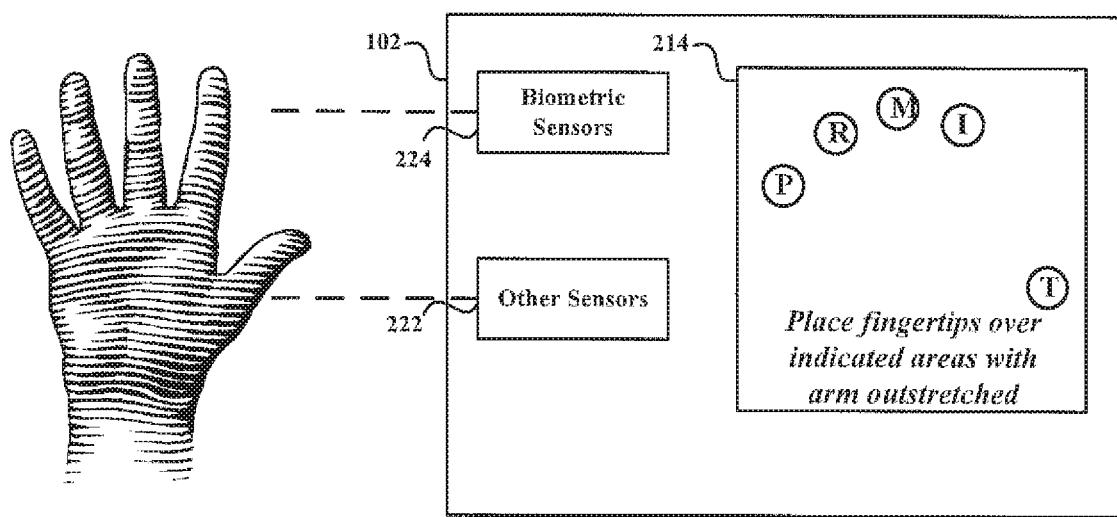
FIG. 7 is a diagram illustrating a user performing a challenge with optical biometric sensors.

FIG. 7 is a diagram illustrating a user performing a challenge with optical biometric sensors. As described previously biometric sensors 224 and other sensors 222 may include optical sensors such as a camera that may be configured for sensing a position and depth of field of user 120 for creating a two-dimensional model 300 from a three-dimensional object. The camera may be coupled to a set-top box, a personal or laptop computer, or a wearable computing device having a head-mounted display such as an eyeglass projection sensor. As shown in FIG. 7, computing device 102 may generate a similar challenge to the challenge that was generated on the touch screen device shown in FIGS. 4-6, but adapted for an optical or other biometric sensor shown in FIG. 7. In particular display component 214 may display the generated challenge along with instructions that allow biometric sensors 224 in combination with other sensors 222 to obtain sufficient information about user 120 to create a biometric model, such as model 300, and then authenticate user using the created model. The instructions may include text, a displayed motion demonstrating the challenge, or a voice command, providing instructions for aligning a biometric identifier to complete the challenge, and may also include an indication when the alignment is complete and a timer indicating how long user 120 has left to complete the challenge.

Figure 8:
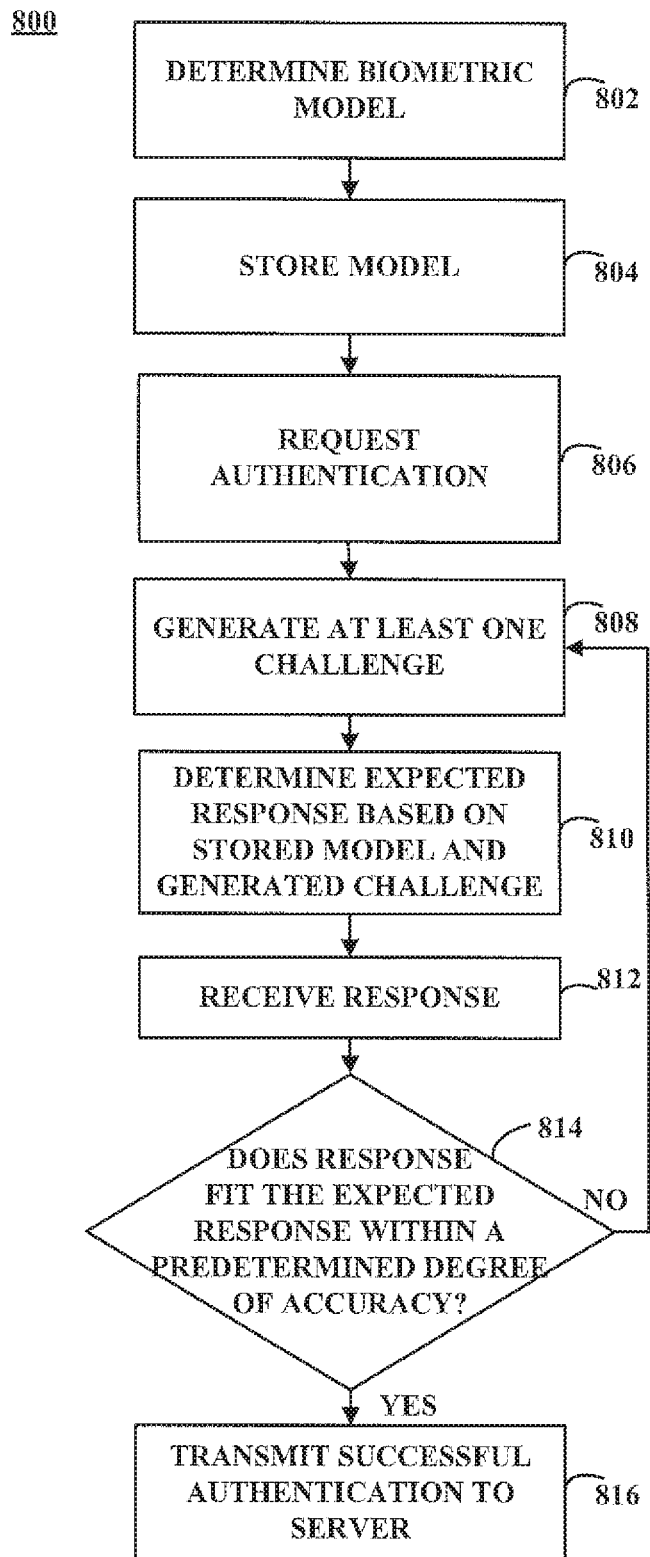
FIG. 8 is a flowchart illustrating a process for authenticating a user using a biometric model, consistent with some embodiments.

FIG. 8 is a flowchart illustrating a process 800 for authenticating a user using a biometric model, consistent with some embodiments. For the purpose of illustration, FIG. 8 will be described with reference to any of FIGS. 1-7. Process 800 shown in FIG. 8 may be embodied in computer-readable instructions for execution by one or more processors in processing component 206 such that the steps of process 800 may be performed by client computing device 102. As shown in FIG. 8, process 800 begins by determining a biometric model (802). Consistent with some embodiments, determining a biometric model may include issuing at least one challenge and receiving responses to the challenges. The at least one issued challenge may be part of a training set up that may be performed during an initial set up of client computing device 102. The responses may be issued in order to learn unknown values of the model. For example, to determine model 300, challenges may be issued in order to learn distances d1-d5 and radial values α, β, δ, γ, ε, ζ, and η, which may be an angle or a radial distance. Moreover, the issued challenges may be adaptive such that a successive challenge attempts to determine values that a previous response did not provide. Further, the challenges may determine which values have the greatest source of error and issue challenges in order to attempt to reduce this error. A method for determining a biometric model is described in additional detail below with reference to FIG. 9.

After a model has been determined, the model is stored (802). Consistent with some embodiments, the model may be stored locally in client computing device 102 in any of memories 208, 210, and 212. In some embodiments, the model may be stored on remote server 106, which may a service provider server or an identity clearinghouse server. While the model may be stored, it may be modified over time to change and adapt with user 120 as they change or age by issuing additional challenges to retrain and re-determine the model. Computing device 102 may then request authentication to remote server 106 (806). According to some embodiments, the request for authentication is issued to remote server in response to user 120 attempting to access features provided by remote server 106 using computing device 102. In response to the request for authentication, authentication app 122 on remote server may send a message that triggers authentication app 112 of computing device to generate at least one challenge (808). According to some embodiments, the at least one challenge may be generated based on the stored biometric model.

After the challenge is generated, processing component 206 of computing device may calculate an expected response based on the stored biometric model and the generated challenge (810). Computing device 102 may then receive a response to the generated challenge (812). Consistent with some embodiments, the response may be received by biometric sensors 224 or other sensors 222, or a combination thereof. Further, the response may be received by display component 214 which may be a touch screen device that incorporates biometric sensors 224. The response may also be received by biometric sensors 224 that are separate from but coupled to computing device 102. Processing component may then determine if the received response fit the calculated expected response within a predetermined degree of accuracy (814). According to some embodiments, if the response does not fit the expected response within a predetermined degree of accuracy, computing device 102 may generate a subsequent challenge based on the stored model (808). However, if the response fits the expected response within a predetermined degree of accuracy, computing device 102 may transmit an indication to remote server 106 that the authentication was successful (816). According to some embodiments, the transmitted indication may be in the form of a token, certificate, or other secure identifier of a successful authentication.

According to some embodiments, the predetermined degree of accuracy achieved by the response may determine the level of access user 120 has to services offered by remote server 106. For example, a very high degree of accuracy achieved (i.e., very small error), indicates a very high probability that user 120 is who they are claiming to be, and more services, or a higher tier of services, may be provided to user 120. Similarly, a low, but passing, degree of accuracy indicating higher error, may indicate a good probability that user 120 is who they are claiming to be and may allow a lower tier of services. A geographical location of user 120 may also be captured and used to determine a user's 120 access to services based on a known or past location of user 120. Tiered authentication is further described in U.S. application Ser. No. 13/605,886, filed on Sep. 6, 2012, the entire contents of which are hereby incorporated by reference in their entirety.

Figure 9:
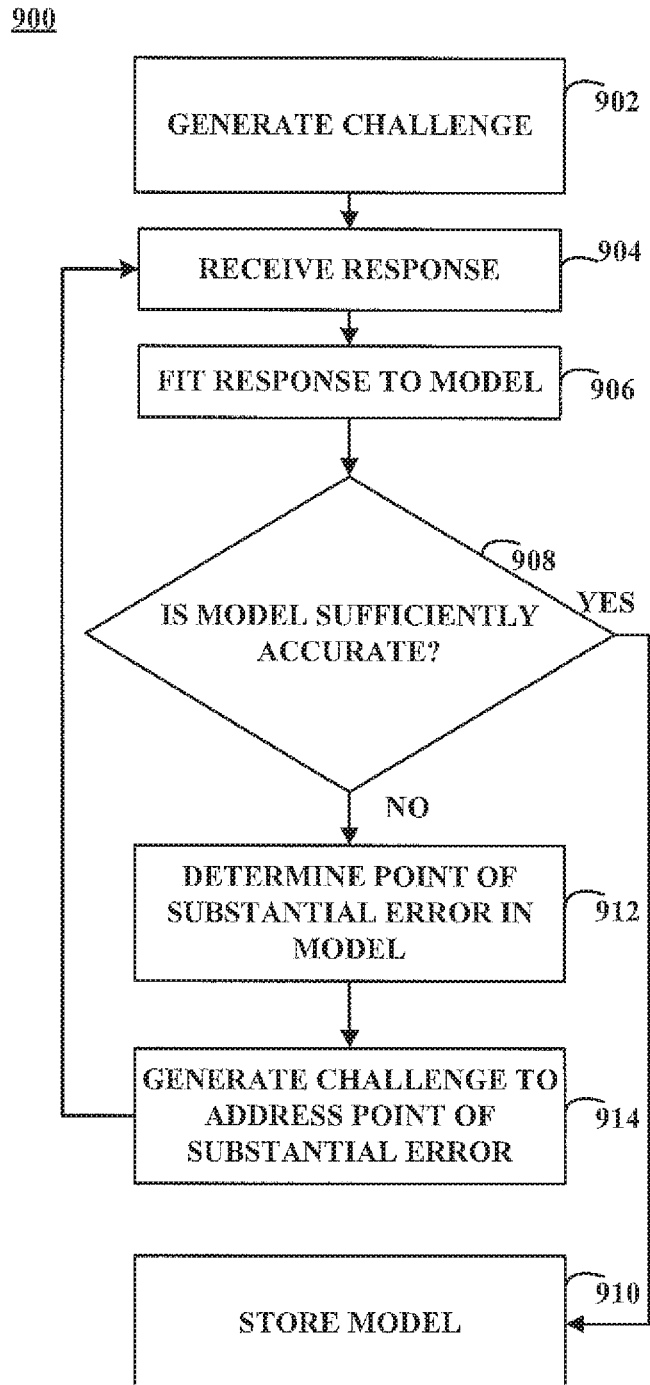
FIG. 9 is a flowchart illustrating a process for creating a biometric model, consistent with some embodiments.

FIG. 9 is a flowchart illustrating a process 900 for creating a biometric model, consistent with some embodiments. For the purpose of illustration, FIG. 9 will be described with reference to any of FIGS. 1-7. Process 900 shown in FIG. 9 may be embodied in computer-readable instructions for execution by one or more processors in processing component 206 such that the steps of process 900 may be performed by client computing device 102. As shown in FIG. 9, process 900 begins by generating a challenge (902). According to some embodiments, the challenge may be generated by biometric model application 114, and may be a challenge designed to obtain a model that is tailored to computing device 102 and user 120. For example, if computing device 102 has biometric sensors 224 that are limited in size, the biometric model that may be created may be a more limited model or uses different measurements to obtain the model and, as a result, issues appropriate challenges. Moreover, if computing device 102 uses optical sensors for obtaining biometric readings, such as shown in FIG. 7, the generated challenge may be tailored for optical 2D modeling of a 3D object such as a hand of user 120.

Computing device 102 may then receive a response to the generated challenge (904). Consistent with some embodiments, the response may be received by biometric sensors 224 or other sensors 222, or a combination thereof. Further, the response may be received by display component 214 which may be a touch screen device that incorporates biometric sensors 224. The response may also be received by biometric sensors 224 that are separate from but coupled to computing device 102. Processing component 206 may fit the received response to the model (906). Processing component 206 may then determine if the model is sufficiently accurate (908), wherein sufficiently accurate refers to having a model that can identify user within a predetermined degree of accuracy. If the model is sufficiently accurate such that user 120 can be identified using the model with a predetermined degree of accuracy, the model will be stored (910). Consistent with some embodiments, the model may be stored locally in client computing device 102 in any of memories 208, 210, and 212. In some embodiments, the model may be stored on remote server 106, which may a service provider server or an identity clearinghouse server. While the model may be stored, it may be modified over time to change and adapt with user 120 as they change or age by issuing additional challenges to retrain and re-determine the model.

If the model is not sufficiently accurate, processing component 206 may determine a point of substantial error in the model (912). Consistent with some embodiments, a point of substantial error may be a missing distance or angle, or other value in which insufficient information has been obtained. That is, a point of substantial error may be a missing value or value having insufficient information such that a user 120 cannot be identified using a model within a predetermined degree of accuracy. Once a point of substantial error has been determined, a challenge that attempts to address the determined substantial point of error is generated (914). Consequently, biometric model application 114 executed by one or more processors of processing component 206 may repeat steps 904, 906, 908, 912, and 914 until the model is determined to be sufficiently accurate, and then stored. That is, the generated challenges may be adaptive so that they attempt to address substantial points of error in the model to improve the model until it is sufficient so that user 120 can be identified using the model within a predetermined degree of accuracy.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for authentication based on a biometric model of a user. In particular, embodiments as described herein determine a biometric model of a user and then generate challenges based on the biometric model. The response to the challenges may be fit to the model, an error associated with the fitted response may be determined, and a user may be authenticated if the error is within a predetermined range. Moreover, the user may be granted tiered authentication based on the error, wherein lower error provides greater privileges, and higher error provides lesser privileges. The examples provided above are exemplary only and are not intended to be limiting. One skilled in the art may readily devise other systems consistent with the disclosed embodiments which are intended to be within the scope of this disclosure. As such, the application is limited only by the following claims.

The invention claimed is:

1. A system, comprising:
a non-transitory memory; and
one or more hardware processors coupled to the non-transitory memory and configured to read instructions from the non-transitory memory to cause the system to perform operations comprising:
providing an authentication challenge to a user, the authentication challenge configured to authenticate the user based on a biometric model tailored to the user;
detecting, from one or more sensors, a response to the authentication challenge;
determining a degree of accuracy that the detected response matches an expected response based on the biometric model; and
providing, to the user, a tier of access to a service, wherein the tier of access to the service is based on the determined degree of accuracy and corresponds to a full access to the service when the degree of accuracy is above a predetermined threshold.

2. The system of claim 1, wherein the degree of accuracy is a first degree of accuracy, and wherein the operations further comprise:
in response to determining that the first degree of accuracy falls below the predetermined threshold, providing a second authentication challenge to the user based on the biometric model, wherein the tier of access to the service is further based on a second degree of accuracy of a second response to the second authentication challenge.

3. The system of claim 1, wherein the tier of access is selected from a plurality of tiers of access.

4. The system of claim 3, wherein a first tier of access of the plurality of tiers of access higher than a second tier of access of the plurality of tiers of access is provided when the detected response matches the expected response with a first degree of accuracy higher than a second degree of accuracy, the first degree of accuracy being associated with the first tier of access and the second degree of accuracy being associated with the second tier of access.

5. The system of claim 1, wherein the tier of access to the service is further based on a detected location of the system.

6. The system of claim 1, wherein the operations further comprise:
in response to a detected biometric change of the user providing one or more additional challenges to the user;
obtaining one or more additional responses to the one or more additional challenges; and
modifying the biometric model based on the one or more additional responses.

7. The system of claim 1, wherein the operations further comprise tailoring the authentication challenge based on data associated with a three-dimensional biometric identifier of the user obtained from the one or more sensors.

8. The system of claim 1, wherein the authentication challenge requires the user to position a biometric identifier in alignment with a graphical instruction, and wherein the operations further comprise:
providing the graphical instruction on a display; and
displaying an indicator in response to detecting that the biometric identifier is in alignment with the graphical instruction.

9. A method for authenticating a user, comprising:
providing an authentication challenge to the user, the authentication challenge configured to authenticate the user against a biometric model tailored to the user;
detecting, from one or more sensors, a response to the authentication challenge;
determining, based on the biometric model, that the detected response matches an expected response within a degree of accuracy;
in response to detecting a biometric change of the user, providing one or more additional challenges to the user;
modifying the biometric model based on one or more additional responses to the one or more additional challenges;
transmitting, via a network interface component, an indication of a successful authentication in response to determining that the detected response matches the expected response within the degree of accuracy; and
receiving access to a service based on the detected response matching the expected response within the degree of accuracy.

10. The method of claim 9, further comprising tailoring the authentication challenge based on data associated with a three-dimensional biometric identifier of the user obtained from the one or more sensors.

11. The method of claim 9, wherein the determining that the detected response matches the expected response comprises determining a degree of accuracy that the detected response matches the expected response based on the biometric model.

12. The method of claim 11, wherein the receiving the access to the service comprises receiving a tier of access to the service based on the degree of accuracy.

13. The method of claim 12, wherein the tier of access to the service is further based on a detected location of a device of the user.

14. The method of claim 9, wherein the authentication challenge requires the user to position a biometric identifier in alignment with a graphical instruction, and wherein the method further comprises:
   providing the graphical instruction on a display; and
   displaying an indicator in response to detecting that the biometric identifier is in alignment with the graphical instruction.

15. A non-transitory machine-readable medium having stored thereon machine-readable instructions executable to cause a machine to perform operations comprising:
   providing an authentication challenge to a user, the authentication challenge configured to authenticate the user based on a biometric model tailored to the user;
   detecting, from one or more sensors, a response to the authentication challenge;
   determining a degree of accuracy that the detected response matches an expected response based on the biometric model; and
   providing, to a device of the user, a tier of access to a service, wherein the tier of access to the service is based on the degree of accuracy and corresponds to a full access to the service when the determined degree of accuracy is above a predetermined threshold.

16. The non-transitory machine-readable medium of claim 15, wherein the degree of accuracy is a first degree of accuracy, and wherein the operations further comprise:
   providing, in response to determining that the first degree of accuracy falls below the predetermined threshold, a second authentication challenge to the user based on the biometric model, wherein the tier of access to the service is further based on a second degree of accuracy associated with a second response to the second authentication challenge.

17. The non-transitory machine-readable medium of claim 15, wherein the tier of access is selected from a plurality of tiers of access, wherein a first tier of access of the plurality of tiers of access higher than a second tier of access of the plurality of tiers of access is provided when the detected response matches the expected response with a first degree of accuracy higher than a second degree of accuracy, the first degree of accuracy being associated with the first tier of access and the second degree of accuracy being associated with the second tier of access.

18. The non-transitory machine-readable medium of claim 15, wherein the operations further comprise:
   in response to a detected biometric change of the user providing one or more additional challenges to the user;
   obtaining one or more additional responses to the one or more additional challenges; and
   modifying the biometric model based on the one or more additional responses.

19. The non-transitory machine-readable medium of claim 15, wherein the operations further comprise tailoring the authentication challenge based on data associated with a three-dimensional biometric identifier of the user obtained from the one or more sensors.

20. The non-transitory machine-readable medium of claim 15, wherein the tier of access to the service is further based on a detected location of a device associated with the user.

* * * * *